United States Patent [19]

Sato

[11] Patent Number: 5,683,259
[45] Date of Patent: Nov. 4, 1997

[54] ROTARY CONNECTOR

[75] Inventor: Yumiko Sato, Miyagi-ken, Japan

[73] Assignee: Alps Electric Co., Ltd., Tokyo, Japan

[21] Appl. No.: 597,786

[22] Filed: Feb. 7, 1996

[30] Foreign Application Priority Data

Feb. 10, 1995 [JP] Japan .................................. 7-022915

[51] Int. Cl.⁶ .................................................. H01R 35/04
[52] U.S. Cl. ................................................ 439/164; 439/15
[58] Field of Search ............................. 439/164, 15

[56] References Cited

U.S. PATENT DOCUMENTS

| | | | |
|---|---|---|---|
| 4,744,763 | 5/1988 | Suzuki et al. | 439/164 |
| 4,936,782 | 6/1990 | Bannai et al. | 439/15 |
| 5,139,436 | 8/1992 | Bonn et al. | 439/15 |
| 5,230,713 | 7/1993 | Schauer | 439/164 |
| 5,429,517 | 7/1995 | Bolen | 439/15 |

Primary Examiner—Gary F. Paumen
Attorney, Agent, or Firm—Guy W. Shoup; Patrick T. Bever

[57] ABSTRACT

A rotary connector including a structure for connecting a flat cable to a lead block. The lead block includes a plurality of parallel joint conductors extending through a resin member. A pair of holding arms extend perpendicularly from the resin member. A window is formed in the resin member through which portions of the joint conductors are exposed, and a pair of projections are provided adjacent the window. The flat cable includes parallel conductors sandwiched by insulating films. A connecting portion of the insulating films is provided at a leading end of the flat cable, and alignment holes are formed in the connecting portion. Portions of the conductors are exposed between the flat cable and the connecting portion, and grooves are formed in sides of the flat cable adjacent the exposed conductor portions. When the flat cable is attached to the lead block, the projections are inserted in the alignment holes formed in the connecting portion, and the holding arms are bent into the grooves to fixedly connect the flat cable to the lead block. The conductors of the flat cable are then welded to the joint conductors of the lead block through the window.

14 Claims, 5 Drawing Sheets

ROTARY CONNECTOR

BACKGROUND OF THE INVENTION

1. Field of the Invention

The present invention relates to a rotary connector incorporated into a steering device of a vehicle to provide an electrical connection between circuitry mounted on a steering wheel and circuitry mounted on the body of the vehicle.

2. Related Art

Conventional rotary connectors typically include a pair of concentric housings which are rotatably connected such that an annular space is formed therebetween, and a flat cable which is wound in the space between the two housings. The flat cable is a flexible cable. Each end of the flat cable is fixed to one of the two housings, and the conductors of the flat cable are electrically connected to circuitry located outside of the housings. One of the housings is used as a movable member and the other housing is used as a fixed member. When the movable member is rotated clockwise or counterclockwise relative to the fixed member, the flat cable is wound or unwound in the space.

The conventional rotary connector described above is typically used for electrically connecting, for example, an air-bag system and a horn circuit mounted on an automobile steering wheel with associated circuitry mounted on the body of the automobile. The fixed member is attached to a steering column of the automobile while the movable member is attached to the steering wheel, and the two ends of the flat cable are electrically connected to the electric/electronic components located on the steering column and the steering wheel, respectively.

In some known rotary connectors, lead wires are connected to the ends of the flat cable within the rotary connector, and the electric/electronic components on the steering column and steering wheel are connected to the flat cable through the lead wires. In these rotary connectors, a plurality of joint bars (conductors) are mounted on an insulating support member and spaced apart in accordance with a predetermined pitch of the conductors of the flat cable. After connecting one conductor of the flat cable and one lead wire to the ends of each joint bar, the end portions of the flat cable, the insulating support member and the insulting layer of the lead wire (including the connected portions) are covered by a resin-formed protecting member. The resin-formed protecting member is then fixed to one of the housings. Because the conductor of the flat cable may be placed upon a flat surface of the joint bar, a connection method such as, for example, ultrasonic welding may be used to connect each conductor of the flat cable with an associated joint bars without cutting off the conductor, which is typically thin and weak. Further, because the conductor and the lead wire are connected to each other through the joint bar, and this connection is protected by the resin-formed protecting member, breaking of the conductor as a result of the tensile force acting on the flat cable or lead wire may be prevented.

A problem with the conventional rotary connector constructed described above is that a special jig is necessary for positioning and holding the flat cable and the insulating support member with respect to each other when each conductor of the flat cable and the respective joint bar are welded, resulting in a complicated assembly process. Further, since the welded portion between each conductor of the flat cable and the respective joint bar is vulnerable to a tensile force, it is necessary to cover these welded portions with a resin-formed protecting member after welding the conductor of the flat cable and the lead wire to the two ends of the joint bar, resulting in poor workability.

SUMMARY OF THE INVENTION

In view of the conventional rotary connectors described above, a first object of the present invention is to provide a rotary connector in which the process of connecting the conductors of the flat cable to joint bars of a lead block is simplified over that of the above-mentioned conventional rotary connectors.

A second object of the present invention is to provide a rotary connector in which the tensile strength after connection is provided using a simple construction.

The above objects are achieved in a rotary connector according to the present invention, including: a pair of housings linked concentrically and rotatable with respect to each other; a flat cable received and wound within a space between the two housings and having a plurality of parallel conductors; a lead block including an insulated resin member connected to one of the housings and having parallel joint bars formed thereon, each joint bar being connected to an end portion of one of the conductors of the flat cable; and lead wires connected to the respective joint bars of the lead block, the lead wires extending to the outside of one of the housings; wherein a metal holding arm extending from a side surface of the resin member is provided on the lead block so that an edge portion of the flat cable is wrapped and held against the lead block by the holding arm.

Further, the second object of the present invention is achieved in the above construction by forming a cutout (notch) on a side surface of the flat cable for engaging the holding arm of the flat cable.

In connecting the flat cable to the joint block, the holding arm is bent to wrap around and hold an edge portion of the flat cable, thereby holding the connectors of the flat cable against the respective joint bars. It is thereby possible to readily weld each conductor of the flat cable to its associated joint bar without using a special jig. A lead block of this type is easily formed by projecting a portion of the outermost joint bars from the side surfaces of the resin member to form the holding arm.

Further, a cutout is formed on a side surface of the flat cable and the holding arm is engaged in the cutout, since the tensile force acting upon the flat cable and lead block is absorbed at a holding portion between the cutout and the holding arm, it is possible to prevent an open circuit caused by breaking the connecting (welded) portion between each conductor of the flat cable and the joint bar without using a resin-formed protecting member, as in the prior art, which requires a complicated forming process.

DETAILED DESCRIPTION OF THE PREFERRED EMBODIMENT

An embodiment of the present invention will now be described with reference to the drawings.

Figure 1:
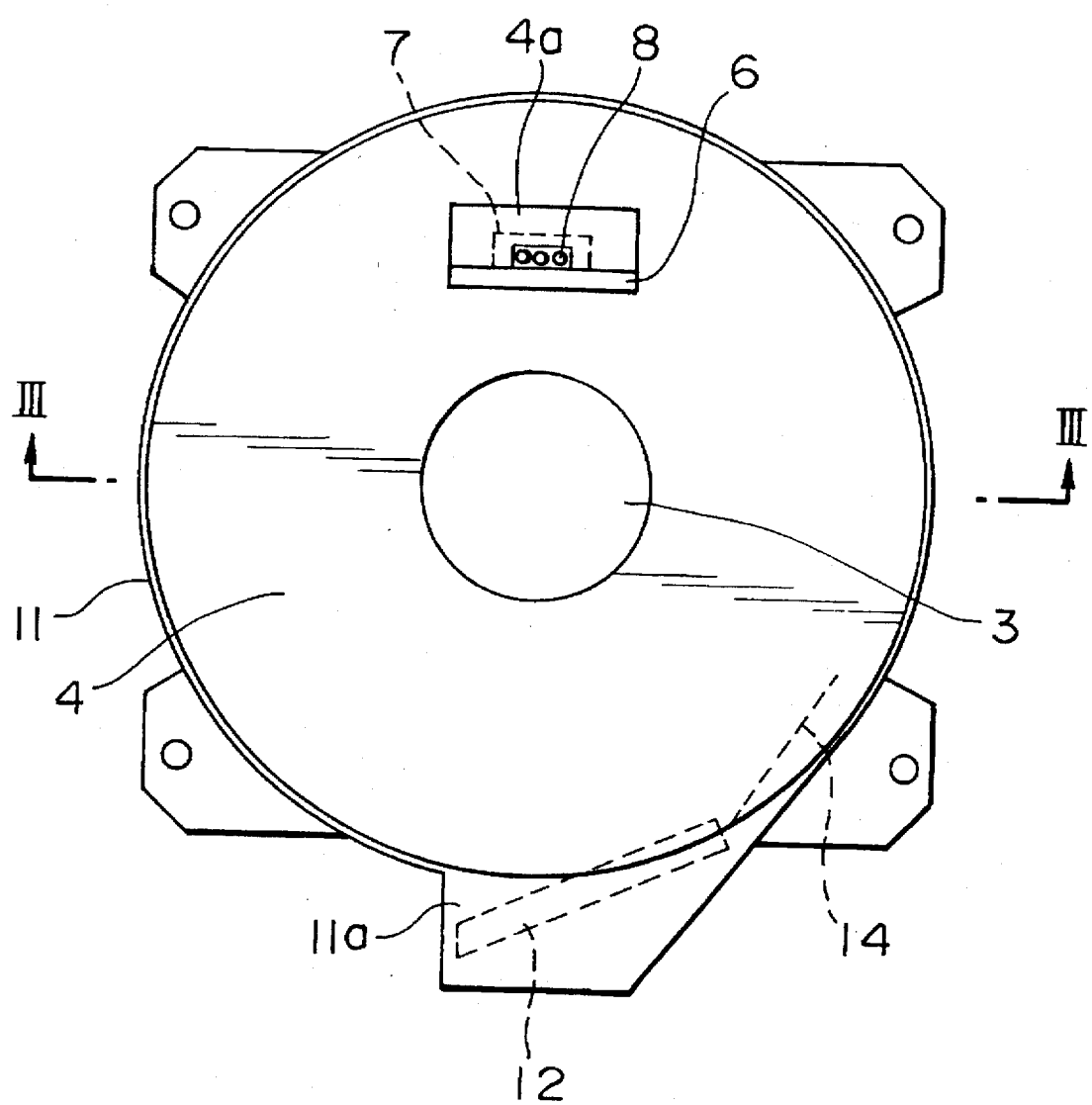
FIG. 1 is a plan view of a rotary connector according to an embodiment of the present invention.
Figure 2:
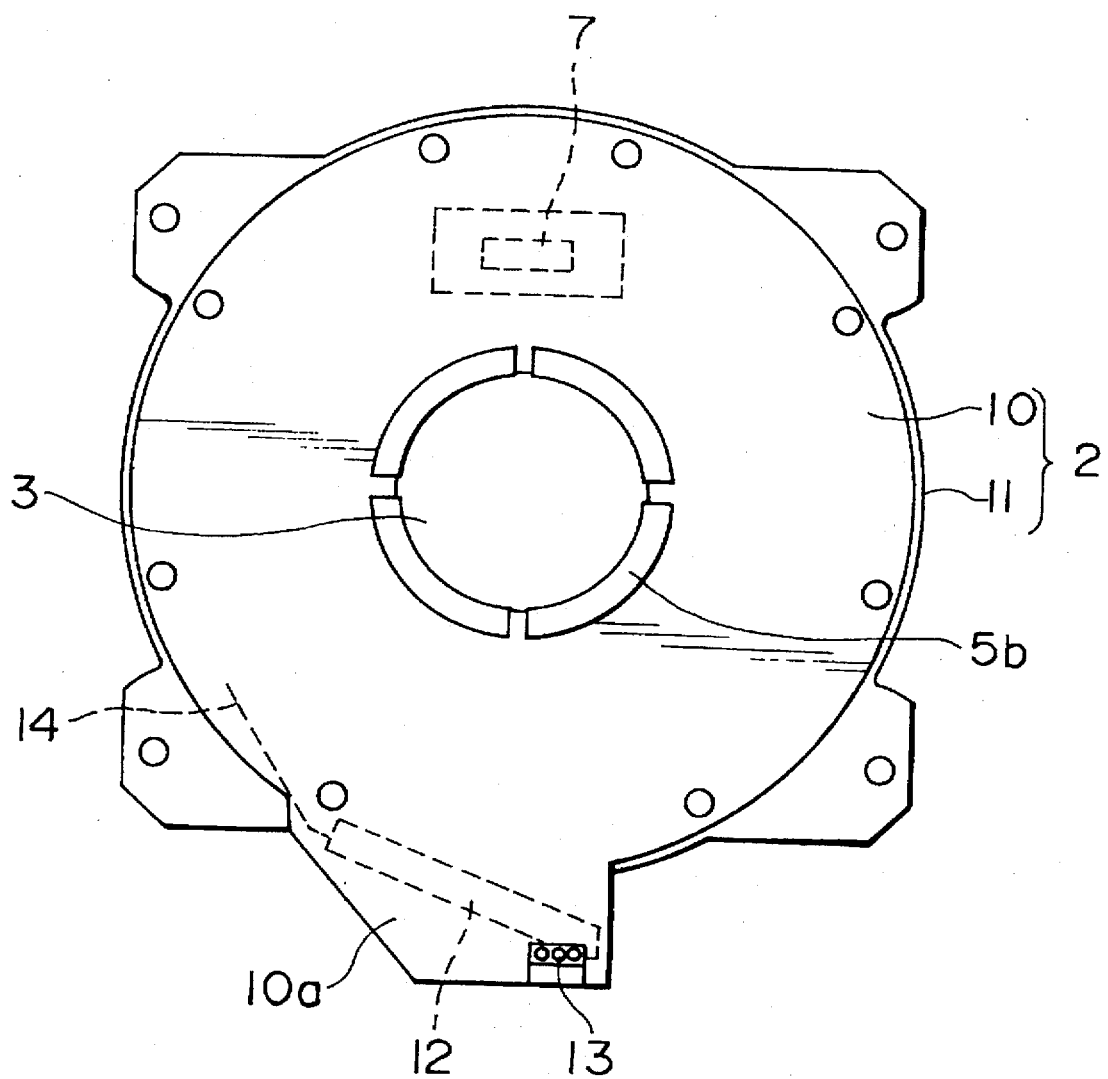
FIG. 2 is a bottom view of the rotary connector.
Figure 3:
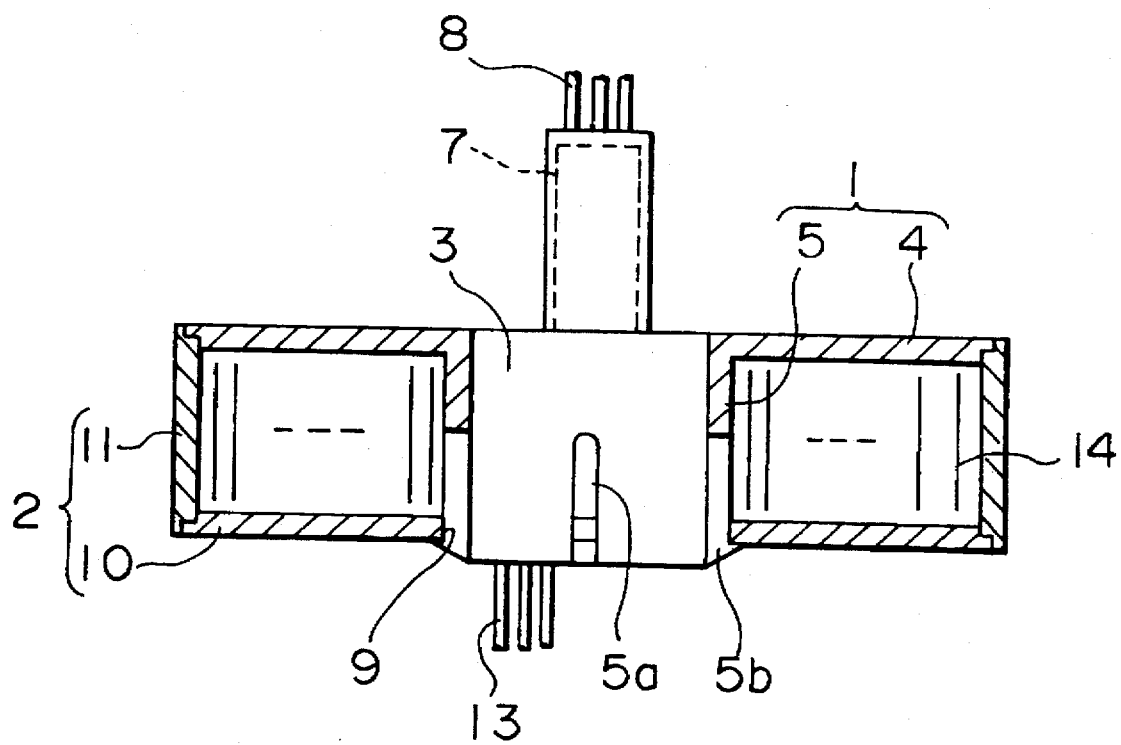
FIG. 3 is a sectional view taken along line III—III of FIG. 1.

Referring to FIGS. 1 to 3, the rotary connector of the present invention includes a first housing 1 which is rotatably connected to a second housing 2. In the present embodiment, the first housing 1 is used as a movable member and the second housing 2 is used as a fixed member. The first housing 1 includes a disc-like ceiling plate 4 having a center hole 3 at a center portion thereof and an inner cylindrical member 5 extending downward from an inner circumferential edge of the center hole 3 (see FIG. 3). A plurality of slits 5a, which extend in the axial direction of the center hole 3, are formed at a lower portion of the inner cylindrical member 5. A snap pawl 5b is formed at a lower end of the inner cylindrical member 5. Further, a projecting portion 4a (FIG. 1) is monolithically formed on the ceiling plate 4 and a cover 6 is attached to one side surface of the projecting portion 4a. A lead block 7 is received and fixed inside the projecting portion 4a and the cover 6. A plurality of lead wires 8 are connected to the lead block 7, each lead wire 8 extending from the first housing 1. An external connector (not shown) is preferably attached to a terminal end of the lead wires 8. The second housing 2 includes a bottom plate 10 having a guide hole 9 formed at a center portion thereof and an outer cylindrical member 11 which extends upwardly from an outer circumferential edge of the bottom plate 10. The bottom plate 10 and outer cylindrical member 11 are joined/integrated by means of, for example, heat staking. Further, projecting portions 10a and 11a (see FIGS. 1 and 2) are integrally formed at respective outer portions of the bottom plate 10 and the outer cylindrical member 11. A lead block 12 is received in the projecting portions 10a and 11a as discussed below. A plurality of lead wires 13 are connected to the lead block 12, each lead wire 13 extending from the second housing 2. An external connector (not shown) is preferably attached to a terminal end of the lead wires 13.

The snap pawl 5b of the inner cylindrical member 5 is snap-coupled into the guide hole 9. The outer circumferential edge of the ceiling plate 4 engages with and slides along an upper end of the outer cylindrical member 11, and the lower end of the inner cylindrical member 5 engages with and slides within the guide hole 9, thereby concentrically linking the first housing 1 and second housing 2 such that they are rotatable with respect to each other. An annular space is defined between the first and second housings 1 and 2, and a flat cable 14 is wound, for example, in a spiral within this space. As described below, the two ends of the flat cable 14 are respectively connected to the lead blocks 7 and 12, which are respectively located inside of the projecting portion 4a and cover 6, and inside of the two projecting portions 10a and 11a.

The rotary connector described above is incorporated into a steering device of a vehicle (not shown). When the rotary connector is mounted on the vehicle, the second housing 2 is attached to a stationary member, such as a steering column, and the lead wires 13 extending from the second housing 2 are connected through an external connector (not shown) to, for example, an air-bag circuit which is located on the vehicle body. Further, the first housing 1 is attached to a steering wheel, and the lead wires 8 extending from the first housing 1 are connected through an external connector (not shown) to, for example, an inflator for an air bag located on the steering wheel. In operation, for example, if the steering wheel is turned such that the first housing 1 is rotated clockwise, the flat cable 14 is wound on the outer circumferential surface of the inner cylindrical member 5. If, to the contrary, the steering wheel is rotated such that the first housing 1 is rotated counterclockwise, the flat cable 14 is unwound toward the inner circumferential surface of the outer cylindrical member 11.

The connecting structure between the two ends of the flat cable 14 and the lead blocks 7 and 12 as well as lead wires 8 and 13 will be described below with respect to the outer end of the flat cable 14.

Figure 5:
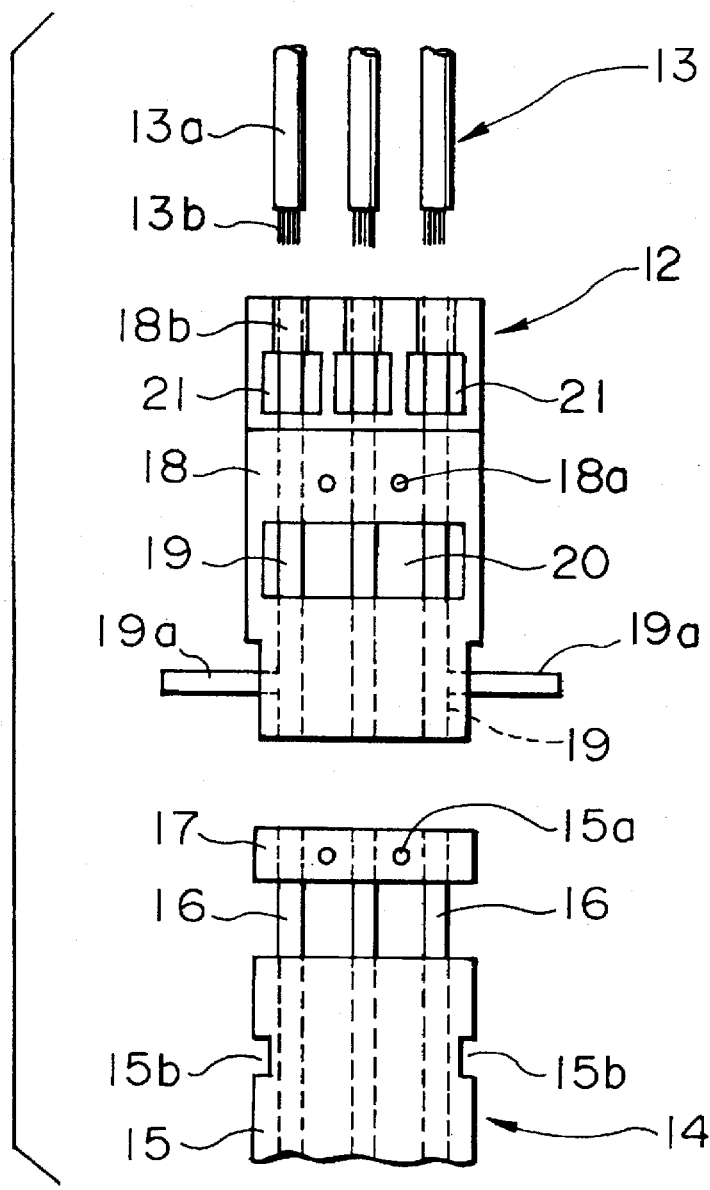
FIG. 5 is an exploded plan view of the connecting portion shown in FIG. 4.
Figure 6:
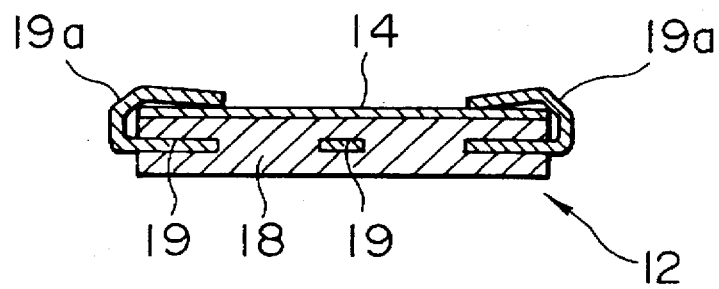
FIG. 6 is a sectional view of the connecting portion between the flat cable and the lead block shown in FIG. 4.

As shown in FIG. 5, the flat cable 14 is formed as a belt-like member such that a pair of insulating films 15 are laminated on a plurality of parallel conductors 16. In the present embodiment, the flat cable 14 includes three conductors 16 embedded therein. Although the conductors 16 are exposed adjacent an end portion of the flat cable 14 by removing the insulating film 15, the terminal ends of the conductors 16 are connected by a connecting portion 17 of the insulating film 16. A pair of positioning holes 15a are formed through the insulating film 16 on this connecting portion 17. Further, cutouts (notches) 15b are formed on the two side surfaces of a portion of the insulating film 16 which is located adjacent the connecting portion 17.

Each lead wire 13 (also referred to as a round cable) includes a cylindrical insulating tube 13a covering a stranded wire 13b which serves as a conductor.

The lead block 12 includes an insulating resin member 18 and a plurality of parallel joint bars (conductors) 19 supported inside of the resin member 18. In the present embodiment, three joint bars 19 are used which correspond to the number of the conductors 16 of the flat cable 14. Each joint bar 19 is formed, for example, from a copper material having an excellent conductivity. Each joint bar 14 has a rectangular cross section and the front and reverse surfaces thereof are flat. A first window 20 and second windows 21 are provided to expose portions of the joint bars 19, and projections 18a are formed at a position between the windows 20 and 21. While the first window 20 is formed as one continuous hole exposing all three joint bars 19, the second windows 21 are separated from each other by portions of the resin member 18 such that one of the joint bars 19 is exposed through each of the second windows 21. Further, a recessed groove 18b is formed from each second window 21 to one end surface of the resin member 18. The interval between the joint bars 19 is substantially equal to the pitch of the conductors 16 of the flat cable 14. Each of the outermost side joint bars 19 includes a holding arm 19a formed integrally thereon. These holding arms 19a project substantially perpendicularly from side surfaces of the resin member 18.

During the process of connecting the flat cable 14 and lead wires 13 to the lead block 12, the flat cable 14 is first placed over the lead block 12, and the projections 18a of the resin member 18 are inserted into the positioning holes 15a of the connecting portion 17. This positions the flat cable 14 with respect to the lead block 12 so that each conductor 16 is overlaid upon the flat surface of an associated joint bar 19 within the first window 20 and the two cutouts 15b are aligned with the two holding arms 19a. The two holding arms 19a are then bent inward into the cutouts 15b thereby connecting an edge portion of the flat cable 14 to the lead block 12. Thereafter, the flat cable 14 and lead block 12 are treated as a monolithic object. Next, the insulating tube 13a of each lead wire 13 is inserted into one of the recessed groove 18b of the lead block 12 such that the terminal end of the stranded wire 13b is positioned over the flat surface of each joint bar 19 within the second window 21. In this state, a welding jig (not shown) is pressed against the overlapping portion of each conductor 16 and associated joint bar 19 exposed through the first window 20. These conductors 16 and joint bars 19 are then subjected to a spot welding or ultrasonic welding. Because, at this time, the flat cable 14 and lead block 12 are monolithically held together by the holding arms 19a, each conductor 16 is readily welded to its associated joint bar 19 without using a special positioning jig. Further, before or after this, a welding jig (not shown) is pressed against the overlapping portion of the stranded wire 13b of each lead wire 13 and its associated joint bar 19 exposed through the second windows 21, and the stranded wires 13b and the joint bars 19 are subjected to spot welding or ultrasonic welding.

Figure 4:
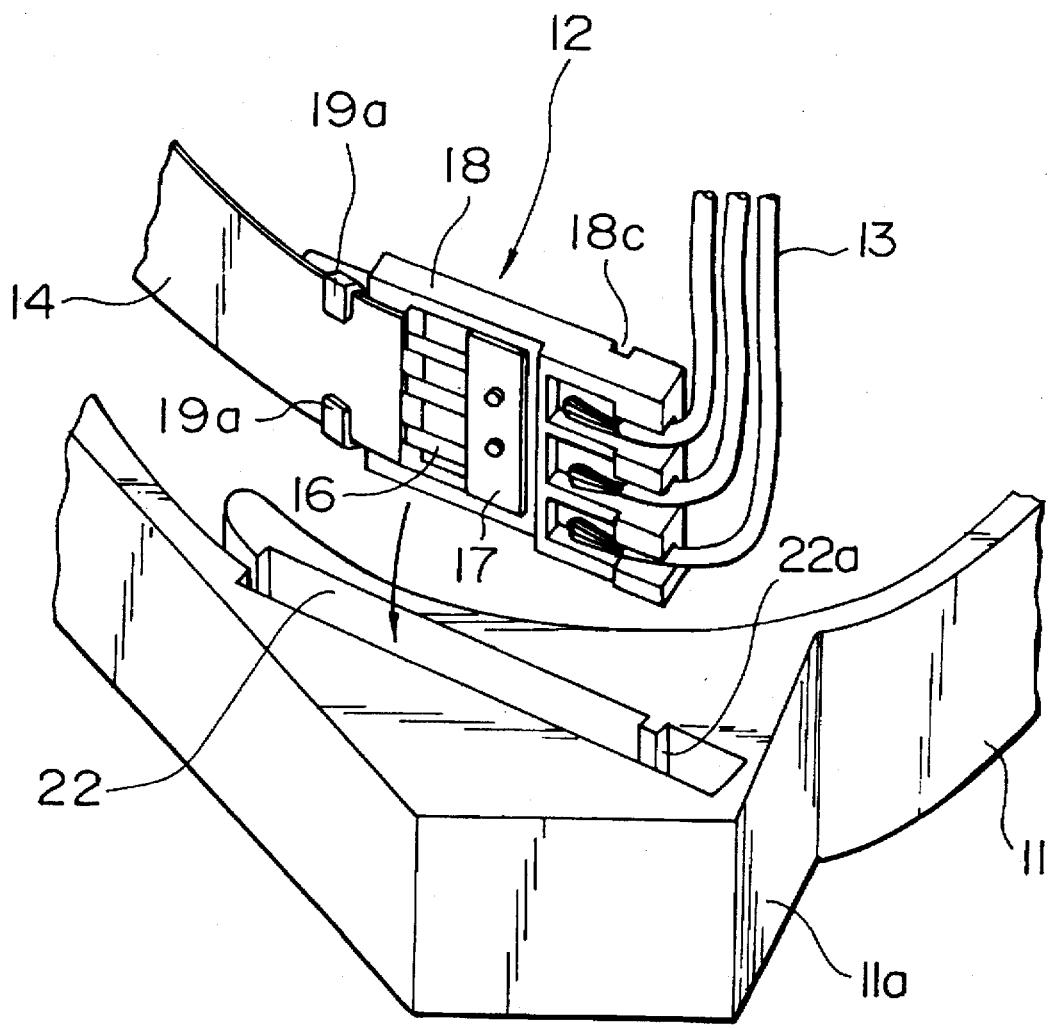
FIG. 4 is a perspective view showing a connecting portion between the flat cable and the lead block, and lead wires which are included in the connector.

After connecting the flat cable 14 and lead wire 13 to the lead block 12 in this manner, the lead block 12 is inserted as shown in FIG. 4 into a receiving recess 22 provided on the projecting portion 11a of the outer cylindrical member 11. The receiving recess 22 serves as a engaging portion for retaining the lead block in the second housing 2, and the wall surrounding the receiving recess 22 serves as a protecting portion for protecting the lead block 12. A guide projection 22a is extended from the inner wall of the receiving recess 22 which is received in a groove 18c formed on the resin member 18 so that the lead block 12 is securely maintained at a predetermined position within the receiving recess 22. Finally, the bottom surface of the outer cylindrical member 11 is covered with the bottom plate 10 and, in the state where the lead wires 13 extend from the bottom plate 10, the bottom plate 10 and outer cylindrical member 11 are joined/ integrated with each other by means of, for example, heat staking, as described above. The lead block 12 is thereby contained and fixed within the projecting portions 10a and 11a of the second housing 2.

Note that, while the inner end of the flat cable 14 has not been described in detail, it is constructed in a similar manner as the connecting structure of the outer end thereof except that the received position of the lead block 7 is held between the projecting portion 4a and the cover 6.

In the above embodiment, since the flat cable 14 and lead block 12 are monolithically held together by a pair of holding arms 19a projecting from the two side surfaces of the resin member 18, welding of the conductors 16 and the joint bars 19 is readily and securely performed without using a special positioning jig. Further, because each holding arm 19a is formed using a portion of one of the outer joint bars 19, the holding arms 19a serve as a positioning part so that the lead block 12 is aligned and attached very easily to the resin member 18. Furthermore, since the cutouts 15b are formed on the two side surfaces of the insulating film 15 of the flat cable 14 and the respective holding arms 19a are retained on these cutouts 15b, the tensile force acting on the flat cable 14 and lead block 12 is absorbed at the engaging portion between the cutouts 15b and the holding arms 19a. Accordingly, unintentional breaking of the connecting portion between each conductor 16 of the flat cable 14 and the joint bar 18 is prevented without using a resin-formed protecting member, which is difficult to form.

It should be noted that, while, in the above embodiment, a description has been given with respect to a rotary connector where lead wires are connected to the two ends of the flat cable through lead blocks, the present invention only requires that at least one end portion of the flat cable is connected to a lead wire through a lead block. For example, it may also be applied to a rotary connector with one side thereof formed as a direct connector where a connector housing is monolithically formed on one of the two housings and one end of the flat cable is connected to a connector terminal provided within the connector housing.

Further, while, in the above embodiment, the holding arm is described as being integrally formed with the joint bars, the holding arm and the joint bars may be formed as separate members. For example, it is also possible that a metal material of the same or a different kind as the joint bars is supported in the resin member together with the joint bars and a part of the metal material is caused to project from a side surface of the resin member to form a holding arm.

As has been described above, according to the present invention, since an end portion of the flat cable is positioned on a lead block by a holding arm provided on the lead block when each conductor of the flat cable is connected to one of the joint bars, each conductor of the flat cable and the associated joint bar is readily welded without using a special positioning jig.

Further, since cutouts are formed on side surfaces of the flat cable and holding arms are retained in the cutouts so that the tensile force acting on the flat cable and lead block is absorbed at the engaging portion between the cutouts and holding arms, breaking of the connecting portion between each conductor of the flat cable and one of the joint bars is prevented without using a resin-formed protecting member, which is difficult to form.

What is claimed is:

1. A rotary connector comprising:

a first housing;

a second housing rotatably connected to the first housing such that an annular space is formed therebetween;

a flexible cable received in the space formed between the first and second housings, the flexible cable including a plurality of first parallel conductors; and a lead block fixed to one of the first and second housings, the lead block including an insulating resin member and a plurality of second conductors disposed in the insulating resin member, each of the plurality of second conductors being electrically connected to one of the plurality of first conductors;

wherein the lead block includes means for attaching the flexible cable to the lead block such that exposed portions of the plurality of first conductors are aligned with exposed portions of the plurality of second conductors;

wherein the attaching means comprises a holding arm provided on the resin member for holding the flexible cable; and wherein the holding arm is formed as one piece with one of the plurality of second conductors.

2. The rotary connector according to claim 1, wherein the attaching means comprises a projection provided on the resin member for engaging a positioning cutout formed on an insulating film of the flexible cable.

3. The rotary connector according to claim 2, wherein the cutout serves as a hole formed in the insulating film of the flexible cable.

4. The rotary connector according to claim 1, wherein the insulating resin member includes a window through which the plurality of first conductors of the flexible cable are welded to the plurality of second conductors.

5. The rotary connector according to claim 1, wherein the lead block is fixed to said one of the first and second housings without an insulating covering.

6. A rotary connector comprising:

a first housing;

a second housing rotatably connected to the first housing such that an annular space is formed therebetween;

a flexible cable received in the space formed between the first and second housings, the flexible cable including a plurality of first parallel conductors;

a lead block fixed to one of the first and second housings, the lead block including an insulating resin member and a plurality of second conductors disposed in the insulating resin member, each of the plurality of second conductors being electrically connected to one of the plurality of first conductors; and lead wires of a cable connected to the lead block such that the lead wires extend from said one of the first and second housings;

wherein the lead block includes means for attaching the lead wires to the lead block such that exposed portions of the lead wires are aligned with exposed portions of the plurality of second conductors.

7. The rotary connector according to claim 6, wherein the attaching means includes a recessed groove formed in the insulating resin member to exposed portions of the plurality of second conductors, and the insulating resin member includes a plurality of windows communicating with the recessed groove through which the lead wires are welded to the plurality of second conductors.

8. A rotary connector comprising:

a first housing;

a second housing rotatably connected to the first housing such that an annular space is formed therebetween;

a flexible cable received in the space formed between the first and second housings, the flexible cable including a plurality of first parallel conductors; and a lead block fixed to one of the first and second housings, the lead block including an insulating resin member and a plurality of second conductors disposed in the insulating resin member, each of the plurality of second conductors being electrically connected to one of the plurality of first conductors; and a plurality of lead wires of a cable connected to the lead block such that each of the plurality of lead wires has a first end electrically connected to one of the plurality of second conductors, and a second end extending from said one of the first and second housings;

wherein the lead block includes first means for attaching the flexible cable to the lead block such that exposed portions of the plurality of first conductors are aligned with exposed portions of the plurality of second conductors; and wherein the lead block includes second means for attaching the lead wires to the lead block such that exposed portions of the lead wires are aligned with exposed portions of the plurality of second conductors.

9. A rotary connector comprising:

a first housing;

a second housing rotatably connected to the first housing such that an annular space is formed therebetween;

a flexible cable received in the space formed between the first and second housings, the flexible cable including a plurality of first parallel conductors; and a lead block fixed to one of the first and second housings without an insulating covering, the lead block including an insulating resin member and a plurality of second conductors disposed in the insulating resin member, each of the plurality of second conductors being electrically connected to one of the plurality of the first conductors; and a plurality of lead wires of a cable having a first end electrically connected one of the plurality of second conductors, and a second end extending from said one of the first and second housings;

wherein the lead block is engaged with an engaging portion provided in said one of the first and second housings and protected by a protecting portion provided in said one of the first and second housings.

10. The rotary connector according to claim 9, wherein the lead block has a positioning part guided by a guide portion provided on an inner wall of a receiving recess serving as the engaging portion of said one of the first and second housings.

11. A rotary connector comprising:

a first housing;

a second housing rotatably connected to the first housing such that an annular space is formed therebetween;

a flexible cable received in the space formed between the first and second housings, the flexible cable including a plurality of first parallel conductors; and a lead block fixed to one of the first and second housings, the lead block including an insulating resin member and a plurality of second conductors disposed in the insulating resin member, each of the plurality of second conductors being electrically connected to one of the plurality of first conductors;

wherein the lead block includes means for attaching the flexible cable to the lead block such that exposed portions of the plurality of first conductors are aligned with exposed portions of the plurality of second conductors; and wherein the insulating resin member includes a window through which the plurality of first conductors of the flexible cable are welded to the plurality of second conductors.

12. A rotary connector comprising:

a first housing;

a second housing rotatably connected to the first housing such that an annular space is formed therebetween;

a flexible cable received in the space formed between the first and second housings, the flexible cable including a plurality of first parallel conductors; and a lead block fixed to one of the first and second housings without an insulating covering, the lead block including an insulating resin member and a plurality of second conductors disposed in the insulating resin member, each of the plurality of second conductors being electrically connected to one of the plurality of the first conductors; and a plurality of lead wires of a cable having a first end electrically connected one of the plurality of second conductors, and a second end extending from said one of the first and second housings;

wherein the lead block is engaged with an engaging portion provided in said one of the first and second housings.

13. A rotary connector comprising:

a first housing;

a second housing rotatably connected to the first housing such that an annular space is formed therebetween;

a flexible cable received in the space formed between the first and second housings, the flexible cable including a plurality of first parallel conductors; and a lead block fixed to one of the first and second housings without an insulating covering, the lead block including an insulating resin member and a plurality of second conductors disposed in the insulating resin member, each of the plurality of second conductors being electrically connected to one of the plurality of the first conductors; and a plurality of lead wires of a cable having a first end electrically connected one of the plurality of second conductors, and a second end extending from said one of the first and second housings;

wherein the lead block is protected by a protecting portion provided in said one of the first and second housings.

14. A rotary connector comprising:

a first housing;

a second housing rotatably connected to the first housing such that an annular space is formed therebetween;

a flexible cable received in the space formed between the first and second housings, the flexible cable including a plurality of first parallel conductors; and a lead block fixed to one of the first and second housings without an insulating covering, the lead block including an insulating resin member and a plurality of second conductors disposed in the insulating resin member, each of the plurality of second conductors being electrically connected to one of the plurality of the first conductors; and a plurality of lead wires of a cable having a first end electrically connected one of the plurality of second conductors, and a second end extending from said one of the first and second housings;

wherein the lead block is inserted into a receiving recess provided in said one of the first and second housings.

* * * * *

UNITED STATES PATENT AND TRADEMARK OFFICE
CERTIFICATE OF CORRECTION

PATENT NO. : 5,683,259
DATED : November 4, 1997
INVENTOR(S) : Yumiko Sato

It is certified that error appears in the above-indentified patent and that said Letters Patent is hereby corrected as shown below:

In Claim 9, line 16, after "connected" insert --to--.

In Claim 12, line 16, after "connected" insert --to--.

In Claim 13, line 16, after "connected" insert --to--.

In Claim 14, line 16, after "connected" insert --to--.

Signed and Sealed this

Fourth Day of July, 2000

Attest:

Q. TODD DICKINSON

*Attesting Officer*   *Director of Patents and Trademarks*